United States Patent [19]
Cawlfield et al.

[11] Patent Number: 5,282,935
[45] Date of Patent: Feb. 1, 1994

[54] ELECTRODIALYTIC PROCESS FOR PRODUCING AN ALKALI SOLUTION

[75] Inventors: David W. Cawlfield; Jerry J. Kaczur, both of Cleveland, Tenn.

[73] Assignee: Olin Corporation, Stamford, Conn.

[21] Appl. No.: 867,557

[22] Filed: Apr. 13, 1992

[51] Int. Cl.⁵ .............................................. B01D 61/44
[52] U.S. Cl. .................................... 204/98; 204/182.4; 204/182.5; 204/129
[58] Field of Search ..................... 204/98, 182.4, 182.5, 204/96, 129

[56] References Cited

U.S. PATENT DOCUMENTS

| | | |
|---|---|---|
| 2,815,320 | 12/1957 | Kollsman .............................. 204/180 |
| 4,238,305 | 12/1980 | Gancy et al. ......................... 204/180 |
| 4,732,660 | 3/1988 | Plowman et al. ..................... 204/265 |
| 4,931,168 | 6/1990 | Watanabe et al. .................... 204/284 |
| 4,969,983 | 11/1990 | Parsi ...................................... 204/182.4 |
| 4,976,832 | 12/1990 | Boateng ................................ 204/98 |
| 5,092,970 | 3/1992 | Kaczur et al. ........................ 204/98 |

*Primary Examiner*—John Niebling
*Assistant Examiner*—Arun S. Phasge
*Attorney, Agent, or Firm*—William A. Simons

[57] ABSTRACT

A bipolar water ionizing electrode and a process employing such an electrode in an electrodialytic cell are disclosed. The cell has a plurality of ion exchange compartments separated by cation permselective membranes and the bipolar water ionizing electrode. The bipolar electrode is permeable to gas and electric current and impervious to liquid.

7 Claims, 2 Drawing Sheets

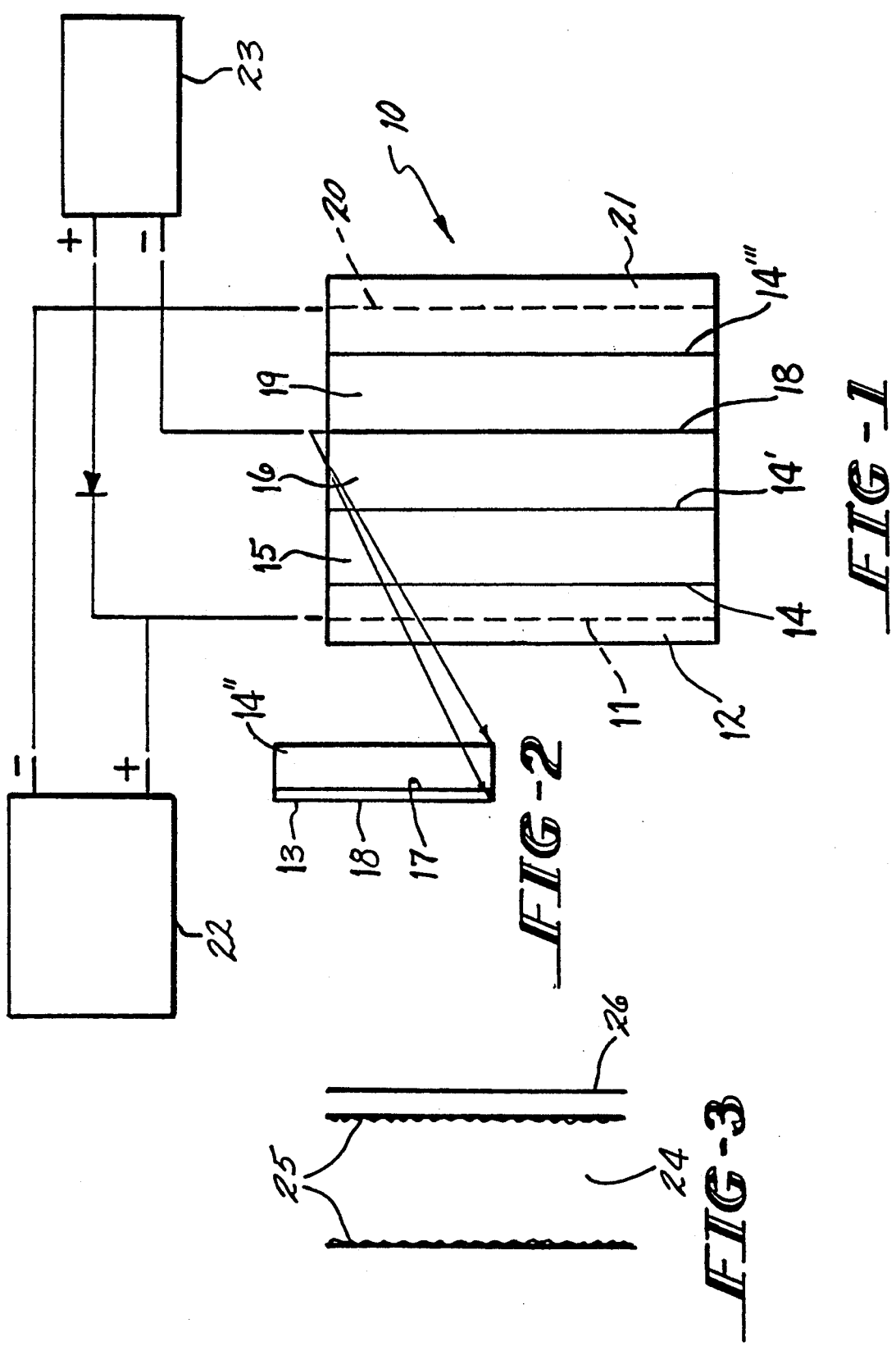

—□—RUN 1 SMOOTH SIDE FACING ANODE

--△--RUN 2 SMOOTH SIDE FACING CATHODE ELECTROLYTE STOOD OVERNIGHT

---○---RUN 3 SAME AS 2 CHARGED FOR 600 AMP-SEC

--✱--RUN 4 SMOOTH SIDE FACING ANODE

·—■—RUN 5 SAME AS 4, BASE CATHOLYTE AND ACID ANOLYTE

_5,282,935_

ELECTRODIALYTIC PROCESS FOR PRODUCING AN ALKALI SOLUTION

BACKGROUND OF THE INVENTION

This invention relates generally to electrodes for use in electrodialytic processes and, more specifically, to a bipolar electrode that produces hydroxyl ions on a side facing an anode and hydrogen ions on the opposite side nearest the cathode in a multi-compartment electrolytic cell.

Techniques exist to employ water splitting membranes in electrodialytic processes. One approach, disclosed in U.S. Pat. No. 4,238,305, employs a process that uses a two compartment electrodialytic unit that alternates bipolar ion exchange membranes and cation permselective ion exchange membranes between the two electrodes. This process electrodialytically converts impure solutions of sodium bicarbonate to high purity carbon dioxide and high purity and concentrated sodium hydroxide. However, the process disclosed in this reference is not cost effective when compared to the reliable lime-soda process traditionally employed to produce sodium hydroxide. This process has relatively high resistance that prevents it from being practiced at high current densities. The bipolar ion exchange membranes would be unstable if exposed to the high temperatures needed to reduce the electrolyte's resistance in the electrolytic cell. Further, it is unlikely that high current density operation could be achieved simultaneously with the complete removal of sodium from the solution, since the conductivity of the solution is reduced when the sodium bicarbonate is depleted. Anion impurities, such as sulfate, must be added to the solution to improve the performance of the process.

Bipolar membranes previously employed in water splitting applications transport water, but are limited by their ability to operate in strongly corrosive solutions, their inability to withstand high operating temperatures and their relatively high operating resistance.

These problems are solved in the process and in the design of the water ionizing electrode of the present invention by providing a water ionizing electrode for use in an electrodialytic process capable of producing acids and alkali solutions from neutral salts.

SUMMARY OF THE INVENTION

It is an object of the present invention to provide a process which produces alkali solutions and acids from salts, while improving the current efficiency and reducing the voltage requirements of the process.

It is another object of the present invention to provide a cost effective and simple process to produce acids and alkali solutions from salts.

It is a feature of the present invention that during the process oxygen gas and hydrogen ions are generated in the anode chamber where current passes into an acid.

It is another feature of the present invention that the hydrogen ions are transported into a separate compartment that is filled with ion exchange resin so that the hydrogen ions react with sodium carbonate to ultimately generate carbon dioxide gas.

It is still another feature of the present invention that the sodium ions in the same anode chamber as the hydrogen ions are transported through a cation permselective membrane into an adjacent compartment where they combine with hydroxyl ions produced at the water ionizing electrode to make sodium hydroxide.

It is yet another feature of the present invention that the bipolar water ionizing electrode operates at nearly 100% current efficiency.

It is still another feature of the present invention that the bipolar water ionizing electrode transports atomic and molecular hydrogen and passes electrons countercurrently to the flow of the hydrogen.

It is an advantage of the present invention that the bipolar water ionizing electrode operates at a low voltage.

It is another advantage of the present invention that the bipolar water ionizing electrode is stable and maintains its properties at temperatures greater than about 90° C.

It is a further advantage of the present invention that the bipolar water ionizing electrode possesses nearly 100% selectivity.

It is still another advantage of the present invention that the bipolar water ionizing electrode, when used in an electrolytic process requiring an electrolytic cell voltage of less than about 2.5 volts and a high current efficiency, will result in substantial power consumption savings.

These and other objects, features and advantages are obtained by the process of the present invention which employs an electrically conductive and hydrogen permeable bipolar electrode in a process to produce acids and alkali solutions from salts while operating at relatively low voltage and high current density.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 1 is a side elevational view of a section of an electrodialytic cell employing a bipolar electrode in the process of the present invention;

FIG. 2 is an enlarged view showing the water ionizing electrode and a cation permselective membrane as they are positioned in the cell employed in the process of the present invention;

FIG. 3 is a side elevational view of a second potential embodiment of the water ionizing electrode utilizing a thin cation permselective membrane on the anode side and a hydrophobic porous electrode having catalyst impregnated outer layers; and FIG. 3 is a graphical illustration of the performance of the water ionizing electrode of Examples 1-5 plotting the potential measured across the electrode in volts versus the current applied measured in milliamps per square centimeter displayed on a logarithmic scale.

DETAILED DESCRIPTION OF THE PREFERRED EMBODIMENT

Figure 4:
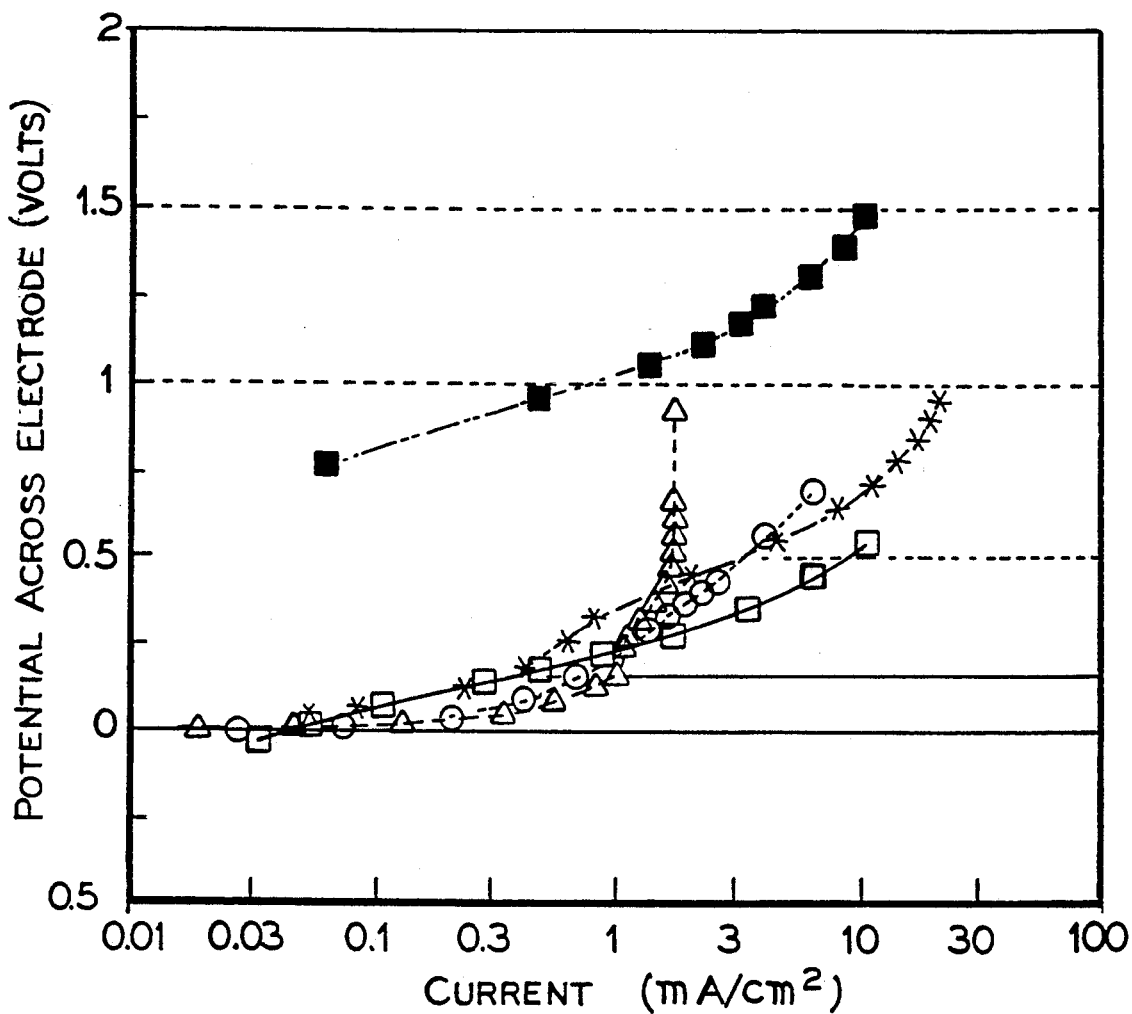

FIG. 1 shows a cell, indicated generally by the numeral 10, in which the process of the present invention may be employed. The cell is designed to produce a solution of alkali metal hydroxide and carbon dioxide from a solution of sodium bicarbonate. It can also be used in processes which produce caustic soda and hydrochloric acid from sodium chloride, caustic soda and sulfuric acid from sodium sulfate, hydrochloric acid and potassium hydroxide from potassium chloride, caustic soda and carbon dioxide from trona, caustic soda and boric acid from sodium tetraborate (borax), hydrochloric acid and ferric oxide from waste pickling liquors or ammonia and hydrochloric acid from ammonium chloride.

Cell 10 has the current pass into an acid solution via the anode 11. The acid solution is contained in anode compartment or chamber 12. Oxygen gas and hydrogen ions are generated in chamber 12. A cation permselective membrane 14 selectively transports the hydrogen ions into the ion exchange compartment 15, which is filled with ion exchange resin beads. The hydrogen ions react with sodium carbonate to produce dissolved carbonic acid that leaves the solution as carbon dioxide gas. Sodium ions pass from ion exchange compartment 15 through a second ion exchange membrane 14' into the central compartment 16, where they combine with hydroxyl ions produced at the water ionizing electrode 18 to produce sodium hydroxide.

Atomic hydrogen is produced at the water ionizing electrode 18 by the reduction of water in the compartment 16. This hydrogen passes through the electrode 18 countercurrently to the flow of electrons. At the interface of the water ionizing electrode 18 and a third cation selectively permeable membrane 14'', see briefly FIG. 2, the atomic hydrogen in the water ionizing electrode 18 is oxidized to produce hydrogen ions, which migrate into the membrane 14''. Another ion exchange compartment 19, which is filled with ion exchange resin beads is adjacent electrode 18 on the cathode side. The hydrogen ions that are released from the membrane 14'' react in compartment 19 with a sodium carbonate feed solution that is fed thereinto similarly to that fed into ion exchange compartment 15. Another cation permselective membrane 14''' divides ion exchange compartment 19 from cathode compartment 21, where sodium ions collect and combine with hydroxyl ions generated at the cathode 20 to make sodium hydroxide.

Water may be continuously added and sodium hydroxide continuously withdrawn from compartment 16 and cathode compartment 21. Sodium carbonate feed solution is continuously added to ion exchange compartments 15 and 19 from which sodium depleted solutions containing carbon dioxide gas are also continuously removed.

FIG. 2 shows the embodiment with a thin water ionizing electrode 18 that has a smooth side 13 and a rough side 17. The rough side 17 is adjacent and in contact with the membrane 14''. The electrode 18 has an electrically conductive region that is permeable to gas and electrical current, but is impervious to liquids, such as the electrolyte or gaseous ions, for example $H^+$.

FIG. 3 shows an alternative embodiment of a water ionizing electrode that uses a thick electrode 24 which has its outer surfaces impregnated with an electrocatalytically active material to form bonded layers 25. The electrode material in this configuration can be a hydrophobic, porous polytetrafluorethylene (PTFE) bonded graphite structure. A cation permselective membrane 26 is optionally positioned on the anode side of the electrolyzer.

The water ionizing electrodes 18 or 24 preferably are constructed from palladium. The electrode material also can be selected from other platinum group metals, titanium, niobium or its alloys, or nickel or ferrous alloys, provided they have very high hydrogen permeability. A hydrogen permeable palladium foil is the preferred structure. For optimum operation the metal layer should be less than about 100 microns thick and pore free.

The water ionizing electrodes 18 and 24 appear to work most efficiently when the side facing the anode end of the electrolyzer is smooth. It is theorized that this smoothness increases the capillary pressure that prevents hydrogen from evolving into the solution and also promotes diffusion of the hydrogen through the metal. The side of the electrodes 18 or 24 facing the cathode end of the electrolyzer may be smooth, but more preferably is roughened to minimize the hydrogen overvoltage of the oxidation of hydrogen to hydrogen ions. It is theorized that in order to obtain maximum effectiveness, the metal selected will form an electrically conductive region that possesses the quality of having hydrogen be permeable or mobile therein when present in its atomic form, rather than as diatomic hydrogen or as a metal hydride. Stable and mobile atomic hydrogen helps to reduce the loss of hydrogen gas from the surfaces of the water ionizing electrodes 18 and 24. The electrically conductive metal of the water ionizing electrode is also impervious to liquids. specifically electrolytes, or aqueous ions.

The following anodic half cell oxidation reactions:

$$H_2 \rightarrow 2H^+ + 2e^- \text{ or}$$

$$H_2 + 2OH^- \rightarrow 2H_2O + 2e^-;$$

in addition to the following cathodic half cell reduction reaction:

$$H_2O + 2e^- \rightarrow 2OH^- + H_2$$

occur in an electrolyzer using the water ionizing electrode. This permits the following overall water splitting reaction to be accomplished by the water ionizing electrode:

$$H_2O \rightarrow H^+ + OH^-.$$

Where the water ionizing electrode is of the type disclosed in FIG. 3 having electrocatalytically active outer surfaces, the layers of electrocatalytic material on both sides must be sufficient to catalyze the above half cell reactions.

It has been observed that water ionizing electrodes operate at higher current densities and with lower resistance when they are first pretreated by a cathodic charging with hydrogen. This charging can be performed continuously by using a very small bias current in comparison to the current passed through the anode and cathode by main power supply 22, and may be provided by a second low current power supply 23, as seen in FIG. 1. This charging can also prevent corrosion from occurring to the base metal.

Another type of water ionizing electrode employable is a porous, electrically conductive and hydrophobic electrode. This can be made from the aforementioned PTFE bonded graphite to which no surface active agents have been added to make the structure hydrophilic. Similar electrodes have been utilized as gas consuming electrodes in fuel cells and other applications. For use as water ionizing electrodes, both of the surfaces of the porous electrode can be doped with a hydrogen electrocatalyst, such as a platinum group metal, in order to facilitate the reduction of water to hydrogen gas at one side and the oxidation of hydrogen gas to make hydrogen ions at the other. Palladium is a potential electrocatalyst, but platinum is the most desired electrocatalyst from the platinum group metals. Also suitable as electrocatalysts are oxides of the platinum group metals, including graphite and carbon, as well as oxides of ruthenium, iridium, rhodium, mixtures and alloys thereof with other platinum group or precious metals, such as gold and silver. In order to prevent the gradual loss of hydrogen from this type of water ionizing electrode and the permeation of electrolyte, it is desirable to cathodically charge the electrode with hydrogen. This charging current similarly may be provided by the second low current power supply 23 in FIG. 1.

Where palladium is used as the base metal of the water ionizing electrode 18, a thin porous coating of electrocatalyst may be applied to the anode and/or the cathode side of the electrode. Suitable electrocatalysts include platinum or the aforementioned oxides of the platinum group metals found in Group VIII of the Periodic Table of Elements. These electrocatalysts serve as a preferential site for oxidation or reduction to occur and may protect the base palladium material from corrosion. Suitable materials are those that have a lower hydrogen overvoltage than the base palladium metal, thereby being the preferred site for the reduction of water or oxidation of hydrogen.

One of the primary applications of the water ionizing electrode of this invention is in the production of caustic and carbon dioxide from sodium carbonate, or the naturally occurring sodium carbonate/sodium bicarbonate mineral, trona. In this application, as the sodium ions are removed from the solution in the ion exchange compartments, carbon dioxide bubbles can partially block the passage of current through the solution in the compartment. The cation exchange resin fill provides an ionically conductive path and a medium that can serve as an active mediator to exchange or absorb sodium ions until they are displaced by hydrogen ions. The resin reduces the IR drop in the carbonate/carbon dioxide filled compartments 15 and 19 of FIG. 1 and eliminates the gas blinding effect of $CO_2$ bubbles. This simultaneously improves current efficiency since the presence of anionic impurities are no longer required for conductivity.

In other applications, such as sodium sulfate processing, the feed solution in compartment 15 will become progressively more acidic and will remain highly conductive as sulfuric acid is formed. In applications where a strong acid is produced, the use of ion-exchange resin filled compartments is not advantageous. Instead, a series flow of solution through adjacent compartments improves current efficiency and the conversion of salt to acid. Such a system employing a water ionizing electrode would employ two additional sets of serially arranged compartments 19 and 16 and membrane 14" between the membrane 14' and the ion exchange compartment 19 shown in FIG. 1.

Since the bipolar electrode 18 does not become unstable at high temperatures, it has an inherent advantage over the use of water splitting membranes in cells at high operating temperatures.

Thermodynamically, operating a conventional bipolar electrode with an alkaline solution of about 30% NaOH on the side of the bipolar electrode facing the anode and an acid solution of about pH 4 on the side of the bipolar electrode facing the cathode, it is theorized that $E_O$, the initial potential at which hydrogen and oxygen are created, is expressed by the equation $E_o = 1.23 - (0.0591 \times pH) = 0.99$ volts for the anodic generation of oxygen, as given in the Atlas of Electrochemical Equilibria by M. Pourbaix. Since the $E_o$ for hydrogen formation $= 0.00 + 0.0591(pH) = 0.83$ volts, the net $E_o$ potential across the bipolar electrode becomes 1.82 volts. Allowing another 0.5 volts of overpotential (100 mv H2 and 400 mv O2), results in a minimum potential of about 2.32 volts This is the cell potential contribution of the cell end electrodes 11 and 20. Known current salt-splitting processes will have this 2.32 volt minimum potential voltage for each anode/cathode electrode pair, or bipolar electrode or bipolar membrane present in the electrolytic cell stack. In comparison, the electrode potential of each water ionizing electrode in the instant process has a voltage potential of only about $0.1 + 0.591(pH \text{ cathodic-pH anodic}) = 0.1 + (0.0591)(14-4) = 0.691$ volts, because the energy consuming oxygen gas formation from water splitting does not occur. Thus, the $E_o$ voltage savings is about $2.32 - 0.69 = 1.63$ volts per water ionizing electrode employed. The operating cell voltage of the electrolyzer will increase according to the operating current density, while the voltage savings will remain unchanged for each water ionizing electrode employed.

In order to exemplify the results achieved with the water ionizing electrode of the present invention, the following examples are provided without any intent to limit the scope of the invention to the specific discussion therein.

The examples utilized apparatus which included a 500 ml beaker in which were placed on opposing sides a vertically extending anode and cathode. Each was approximately 3 inches by 6 inches in size and made from a platinum coated titanium. About a 3 mil thick rigid palladium foil sheet about 6 inches in height and extending across practically the entire inner diameter of the beaker was positioned midway between the anode and cathode to serve as the water ionizing electrode. The rigid palladium foil sheet was mounted in liquid-tight fashion to a silicone rubber seal on the sides and bottom of the beaker to prevent electrolyte from passing from the anode side to the cathode side of the beaker. The potential measured across the water ionizing electrode was measured as a function of the electrical current passed between the working electrodes on each side of the water ionizing electrode. The voltage employed in each instance was less than the overall breakdown potential of water, which is taken as about 1.5 volts. No gas generation was observed on either side of the palladium foil water ionizing electrode in each example. This indicated that the foil was operating as a water ionizing electrode with hydrogen being passed through the electrode and consumed in the half cell reactions that occurred.

EXAMPLE 1

The about 3 mil thick palladium foil was placed into sodium chloride brine in a container between the working anode electrode and a working cathode electrode. About a 10% brine solution was used as the electrolyte so that the brine was on both sides of the foil electrode. From about 0.03 to about 10 milliamps per square centimeter of electrical current over about a 0.0 to about 0.5 volt potential was applied to the foil electrode in a first direction. Chlorine evolution on the working anode was observed. This evolved chlorine began to dissolve one side of the palladium. The current was then reversed and the palladium was plated back on the side from which it had begun to dissolve.

The sodium chloride brine electrolyte was replaced with sodium sulfate after appropriate rinsing with deionized water of the beaker and the electrodes. The same level of electrical current was again applied to the electrode. The side of the palladium foil electrode adjacent the anode remained shiny, while the other side was blackened by rapid electrolytic deposition of palladium.

EXAMPLE 2

The replated palladium foil electrode of Example 1 was reutilized in the same apparatus with the smooth surface facing the cathode and the darkened or blackened side facing the anode. Sodium sulfate was used as the electrolyte. The apparatus was allowed to stand overnight with the palladium foil electrode remaining in the sodium sulfate electrolyte. The voltage across the palladium foil electrode was measured at less than about 1.0 volts when significant amounts of current, identified in this instance of between about 1 to about 30 milliamps per square centimeter, were passed across the foil electrode. With the blackened side facing the anode, a limiting current of about 2 milliamps per square centimeter was observed at which the voltage rose sharply between about 0.25 and about 0.90 volts towards the level of a normal bipolar electrode. This was attributed to the fact that the rate of hydrogen diffusion through the palladium is limited by the concentration of the hydrogen in the metal. In this instance, since the palladium foil electrode stood overnight in the sodium sulfate electrolyte, the concentration of hydrogen in the palladium was very low due to its diffusion out of the electrode into the electrolyte and then the surrounding atmosphere.

EXAMPLE 3

The same apparatus as was employed in Example 2 was used, but the palladium foil electrode was charged for about 300 seconds at 2 amps prior to use. The electrolyzer with the water ionizing palladium foil electrode was able to have from about 0.03 to about 5 milliamps per square centimeter of current applied across a voltage potential of from about 0 to about 0.7 volts. It was also observed that the palladium foil electrode carried more current when first made cathodic by charging for a finite period of time to allow the palladium to absorb or soak up hydrogen. The hydrogen appeared to provide cathodic protection to the palladium foil electrode that protected it from corrosion. The cathodic charging appeared to enable operation of the water ionizing palladium foil electrode at current densities higher than 2 milliamps per square centimeter.

EXAMPLE 4

The same apparatus as was employed in Example 3 was used, except that the palladium foil water ionizing electrode position was reversed so that the shiny smooth side was facing the cathode end of the cell and the blackened rough side was facing the anode end of the cell. The electrolyzer with the water ionizing palladium foil electrode was able to have from about 0.04 to about 25 milliamps per square centimeter of current applied across a voltage potential of from about 0 to about 0.9 volts. It was theorized that the asymmetric palladium foil surfaces, i.e. the shiny smooth side and the blackened rough side, improved the performance of the palladium foil electrode. The same observations concerning the cathodic charging as were made with respect to the run in Example 3 were apparent in this Example.

EXAMPLE 5

The same apparatus as was employed in Example 4 was used, except that the sodium sulfate electrolyte was replaced with caustic soda as the catholyte and sulfuric acid as the anolyte. The electrolyzer with the water ionizing palladium foil electrode was able to have from about 0.04 to about 10 milliamps per square centimeter of current applied across a voltage potential of from about 0.75 to about 1.49 volts. This Example showed the effectiveness of the water ionizing palladium foil electrode as a water splitting electrode when the catholyte is a base and the anolyte is an acid, passing electrons countercurrently to the flow of hydrogen. Although the voltage level across the water ionizing electrode increased, the level is still lower than expected in view of the fact that the acid and base electrolytes raise the overall breakdown potential of water about one volt.

While the invention has been described above with references to specific embodiments thereof, it is apparent that many changes, modifications and variations in the materials, arrangements of parts and steps can be made without departing from the inventive concept disclosed herein. For example, in employing the water ionizing electrode of the present invention in a salt-splitting electrolyzer, ion exchange resin may fill the salt compartments in electrolyzers having a two compartment design with a water ionizing electrode and a cation selectively permeable membrane, or a three compartment design with a water ionizing electrode and a cation selectively permeable membrane and an anion selectively permeable membrane, or alternatively a three compartment design with a water ionizing electrode and two cation selectively permeable membranes. The presence of the resin counteracts the build-up of weak acids in the electrolyte that can make the electrolyte ionically non-conductive. Further, the number of three compartment unit cells, i.e. a water ionizing electrode in conjunction with 2 permselective membranes, can be any desired multiple in a multicell design having on opposing ends an anode and a cathode. A similar arrangement can be used for the desired number of two compartment unit cells, i.e. a water ionizing electrode and permselective membrane, between the anode and opposing cathode on the ends of the electrolyzer.

It should also be noted that the electrolyzer of the present invention also can be used to make chloric acid and caustic soda or sodium hydroxide from sodium chlorate. In this instance, the use of an ion exchange resin fill in the ion exchange compartments 15 and 19 would not be preferred.

Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. An electrodialytic process for producing an alkali solution from a salt comprising the steps of:
   a. separating at least one central ion exchange compartment from a first adjacent ion exchange compartment by a bipolar water ionizing electrode on the side of the central ion exchange compartment closer to a cathode and from a second adjacent ion exchange compartment by a first cation permselective membrane positioned on the side of said central ion exchange compartment closer to an anode;

(b) separating a second adjacent ion exchange compartment and an anode compartment by a second cation permselective membrane;

(c) separating a first adjacent ion exchange compartment and a cathode compartment by a third cation permselective membrane;

(d) feeding a sodium carbonate solution to the first adjacent ion exchange compartment and the second adjacent ion exchange compartment;

(e) feeding an anolyte solution into the anode compartment;

(f) feeding a catholyte solution to the cathode compartment;

(g) generating hydrogen ions in the anode compartment and transporting those hydrogen ions through said second cation permselective membrane to said second adjacent ion exchange compartment to produce carbon dioxide;

(h) transporting sodium ions through the first cation permselective membrane from said second adjacent ion exchange compartment to the central ion exchange compartment;

(i) reducing water in the central ion exchange compartment with the bipolar water ionizing electrode; and (j) combining the transported sodium ions with hydroxyl ions produced in the central ion exchange compartment to form sodium hydroxide.

2. The process according to claim 1 further comprising transporting sodium ions in a first ion exchange compartment to the cathode compartment to combine with the catholyte solution to form sodium hydroxide.

3. The process according to claim 2 further comprising using an anolyte solution selected one from the group consisting of aqueous solutions of brine, sodium sulfate and an acid.

4. The process according to claim 3 further comprising sulfuric acid as the anolyte solution.

5. The process according to claim 2 further comprising selecting the catholyte solution from one from the group consisting of aqueous solutions of brine, sodium sulfate and a base.

6. The process according to claim 5 further comprising using sodium hydroxide as the base.

7. The process according to claim 1 further comprising filling the first ion exchange compartment and the second ion exchange compartment with ion exchange resin.

* * * * *